MULTI-TRACK MAGAZINE TAPE RECORDER WITH MOVABLE HEAD AND ELASTIC BAND DRIVE FOR TAPE AND REELS

Filed April 28, 1960 4 Sheets-Sheet 1

INVENTOR.
Willard J. Faulkner
BY
Brown, Jackson, Boettcher & Dienner
Attys.

INVENTOR.
Willard J. Faulkner
BY
Brown, Jackson, Boettcher & Dienner
Attys.

INVENTOR.
Willard J. Faulkner
BY
Brown, Jackson, Boettcher & Dienner
Attys.

INVENTOR.
Willard J. Faulkner
BY
Brown, Jackson, Boettcher & Dienner
Attys.

United States Patent Office 3,154,308

Patented Oct. 27, 1964

3,154,308

MULTI-TRACK MAGAZINE TAPE RECORDER WITH MOVABLE HEAD AND ELASTIC BAND DRIVE FOR TAPE AND REELS

Willard J. Faulkner, Worthington, Ohio, assignor to V-M Corporation, Benton Harbor, Mich., a corporation of Michigan Filed Apr. 28, 1960, Ser. No. 25,396
12 Claims. (Cl. 274—11)

The present invention relates to apparatus such as tape recorders that employ spool or reel supplied information carrying mediums, and to medium containing magazines for such apparatus. The invention in its preferred embodiment is concerned particularly with tape recorders, and the following description is therefore directed to recorders, from which the applicability of the invention to apparatus of the general character described will become apparent to those skilled in the art.

In the tape recorder industry, there have been several objectives of long standing, including a more accurate, efficient and economical manner of driving the tape and winding it from one reel onto another, a more facile manner of supplying and handling the tape, a more compact and economical recorder, and a manner of obtaining more recording time from a tape.

Relative to the first of these objectives, i.e., a more accurate, efficient and economical manner of driving the tape, it has been conventional in the art to employ three spaced parallel drive shafts selectively connectable with the drive motor of the recorder, namely, a capstan shaft normally connected to the motor for driving the tape at predetermined speed during recording or playing of the tape, a take-up shaft adapted for reception of a reel and for connection to the drive motor during recording or playing of the tape for winding the tape onto the reel, and a rewind shaft adapted for reception of a tape supply reel and for connection with the motor upon completion of recording or playing of the tape for rewinding the tape onto the supply reel. In connection with this arrangement, two pressure pads are required for holding the tape in engagement with the capstan and the recording-reproducing head, respectively.

It is a first object of the invention to effect vast simplification of the drive mechanism, and in particular to eliminate the above described take-up and rewind shafts and their associated mechanisms, and the said pressure pads.

Specifically, it is an object of the invention to provide an improved drive mechanism employing just a capstan shaft, the usual two reels and the tape, and a single element taking the place of the rewind and take-up shafts and the pressure pads; said single element comprising an elastic band frictionally engaged with the capstan and stretched over the two reels and the recording-reproducing head in overlying relation to the tape, whereby the band is engaged and driven by the capstan, engages and drives the tape, operatively engages and drives both of the reels, presses the tape against the head and itself against the capstan, and also serves as a retainer for the tape to prevent the tape from spilling off the reels.

Another object of the invention is the provision of an improved tape recorder wherein the recorder itself is comprised essentially of the capstan shaft, its drive motor and a recording-reproducing head, and wherein the two reels, the tape and the elastic drive band are in the form of a magazine detachably associable with the capstan and the head.

While tape magazines have previously been proposed in the art, the same have suffered many disadvantages, principal along which are the loose mounting of the reels to accommodate association of the same with the conventional take-up and rewind shafts, the difficulty of coupling the reels to the shafts and of retaining the reels coupled to the shafts, the difficulty of associating the tape with the capstan and the recording-reproducing head, and the ever present danger of tape spill. Consequently, the tape is conventionally supplied on a single supply reel and must be manually threaded through the recorder and onto the take-up reel.

The present invention has for another of its objects the provision of an improved tape magazine overcoming all of the above stated disadvantages and affording a most facile manner of supplying and handling recording tape or the like.

In particular, it is an object of the invention to provide an improved tape magazine comprising a frame, a pair of reels permanently mounted on the frame in spaced relation to one another for rotation about fixed respective axes, a tape wound on and extending between the reels, and an elastic band stretched over the reels in overlying relation to the tape, the frame accommodating access to the band and to the portion of the tape extending between the reels. As applied to a tape recorder, the frame of the magazine is constructed to accommodate entry into the space between the reels of the capstan and the recording-reproducing head with the head engaging the portion of the tape extending between the reels and offset outwardly from one side of the reels whereby the band is stretched over the head to press the tape thereagainst, and with the capstan engaging the band at the opposite side of the reels and laterally offset therefrom whereby the band is deflected laterally and stretched over the capstan for forcible driving engagement therewith.

A further object of the invention is the provision of an improved tape magazine as above defined including guide spools at one side of the reels for accurately guiding the tape between the reels, and stop means at the opposite side of the reels and generally aligned therewith for engagement with the band when the magazine is disassociated from the recorder for retaining the band, the reels and the tape against movement.

In the resulting combination of the improved recorder and tape magazine of the invention, the tape is associated with the permanently mounted reels and held thereon by the elastic band, so that the magazine may be handled with facility and without danger of tape spill. Also, the magazine eliminates the need for separate guide rolls or spools and pressure pads, so that the customary tortuous tape path may be eliminated from the recorder and the recorder may be comprised essentially of just a rotatable capstan and a recording-reproducing head. Since the two reels are permanently mounted on the magazine frame in operative association with the drive means therefor, i.e., the elastic band, the need for extreme accuracy in associating the reels with the recorder mechanism is eliminated and the magazine may be readily slipped over or onto the capstan and head further to facilitate manipulation and loading of the tape.

In addition to the foregoing, the elimination of the take-up and rewind shafts and their drive trains results in a particularly economical construction and facilitates exceptionally compact fabrication of the recorder, thereby to attain the previously stated general objective of the art.

Further to facilitate compact construction of the recorder, it is an object of this invention to provide means whereby a plurality of sound or information tracks may be recorded on and reproduced from a narrow tape, thereby to reduce the length of tape required, and in turn, to accommodate reduction in the diameter of the tape holding reels and in the overall size of the unit.

It is a particular object of the invention to provide an improved tape machine including a deck over which the tape moves, a recording-reproducing head mounted on the deck for movement transversely of the tape, a cam movably mounted on the deck and operatively connected to said head for moving the same transversely of the tape, means normally biasing said cam for movement in one direction, an escapement surface on said cam for controlling movement thereof in said one direction, and an escapement member engaging said surface and operatively responsive to passage of said tape for momentarily releasing said cam for incremental movement in said one direction, said cam upon incremental movement thereof moving said head a corresponding increment transversely of the tape to dispose said head adjacent a different portion of the tape, whereby a plurality of tracks may be recorded on a single tape.

By way of example, in the embodiment of the invention disclosed herein, eight separate tracks may be recorded on a single tape only ¼ inch wide. Assuming that a recording time of one and one-half hours is desired, and that speed is to be 4 feet per minute, a total recording length of 360 feet would be required, which results according to the invention in actual tape length of only 45 feet. For this length of tape, the reels required are very small, thereby contributing to compactness of the recorder. With recording-reproducing heads able to record within a track width of .006 inch, the apparatus of the invention, in slightly modified form, may record on this same tape a total of twenty-five tracks to afford an effective record length of 1,125 feet and a total recording time of over four and one-half hours. From this it is seen that the present invention obtains greatly increased recording time from a short length of tape, thereby to render practical employment of a short tape and small diameter tape receiving reels in formation of a compact and economical recorder.

In keeping with the foregoing, a further object of the invention is the provision of means for automatically reversing the direction of movement of the tape upon completion of passage thereof in each direction for accommodating continuous recording of a plurality of tracks onto the tape without significant lapse of time in shifting from one track to the next.

More particularly, it is an object of the invention to provide an improved tape machine as above defined including an undulatory surface on said cam correlated to said escapement surface, a reversing member having a follower engaging said undulatory surface, reversible drive means for the tape, and means operatively connected to said member and said drive means for reversing the direction of drive upon each incremental movement of said cam.

Another object of the invention is the provision of an improved tape machine as described wherein the escapement member includes a feeler extending adjacent each reel, and each reel includes a member that is retracted into the reel by the tape wound upon the reel and that is released from the reel upon unwinding of the tape to engage the respective feeler and release said cam for incremental movement, thereby to effect shifting of the recording-reproducing head and reversal of the direction of tape movement.

An additional object of the invention is to provide the aforesaid cam and the elements associated therewith in a compact structural arrangement wherein the cam comprises a small, stamped sheet metal plate having an escapement slot, a head moving cam slot and an undulatory slot therein, and wherein the capstan shaft and head are disposed closely adjacent one another with the cam plate slidably mounted therebetween.

A further object of the invention is the provision of a compact economical recorder wherein conventional bulky and expensive amplifier and speaker components are eliminated, and replaced by a small amplifier of low power requirement and an RF oscillator for emitting a signal of value to operate a conventional receiver, whereby the recorder may be played back via a conventional home or car radio.

A still further object of the invention is the provision of an improved tape recorder of portable character including a battery power supply, a small A.C. motor for driving the tape, and an oscillator energized by said source to operate said motor.

As a consequence of attainment of the above stated objects, the present invention affords a small, lightweight, portable recorder of a size comparable to two packages of cigarettes, that despite its small size provides one and one-half or more hours of recording time.

Other objects and advantages of the invention will become apparent in the following detailed description.

Now, in order to acquaint those skilled in the art with the manner of making and using the improved apparatus and the improved medium containing magazine of the present invention, I shall describe, in connection with the accompanying drawings, a tape recorder comprising a preferred embodiment of the invention, and the preferred manner of making and using the same.

Figure 10:
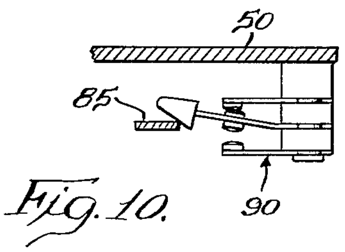
Figures 3, 4, 5:
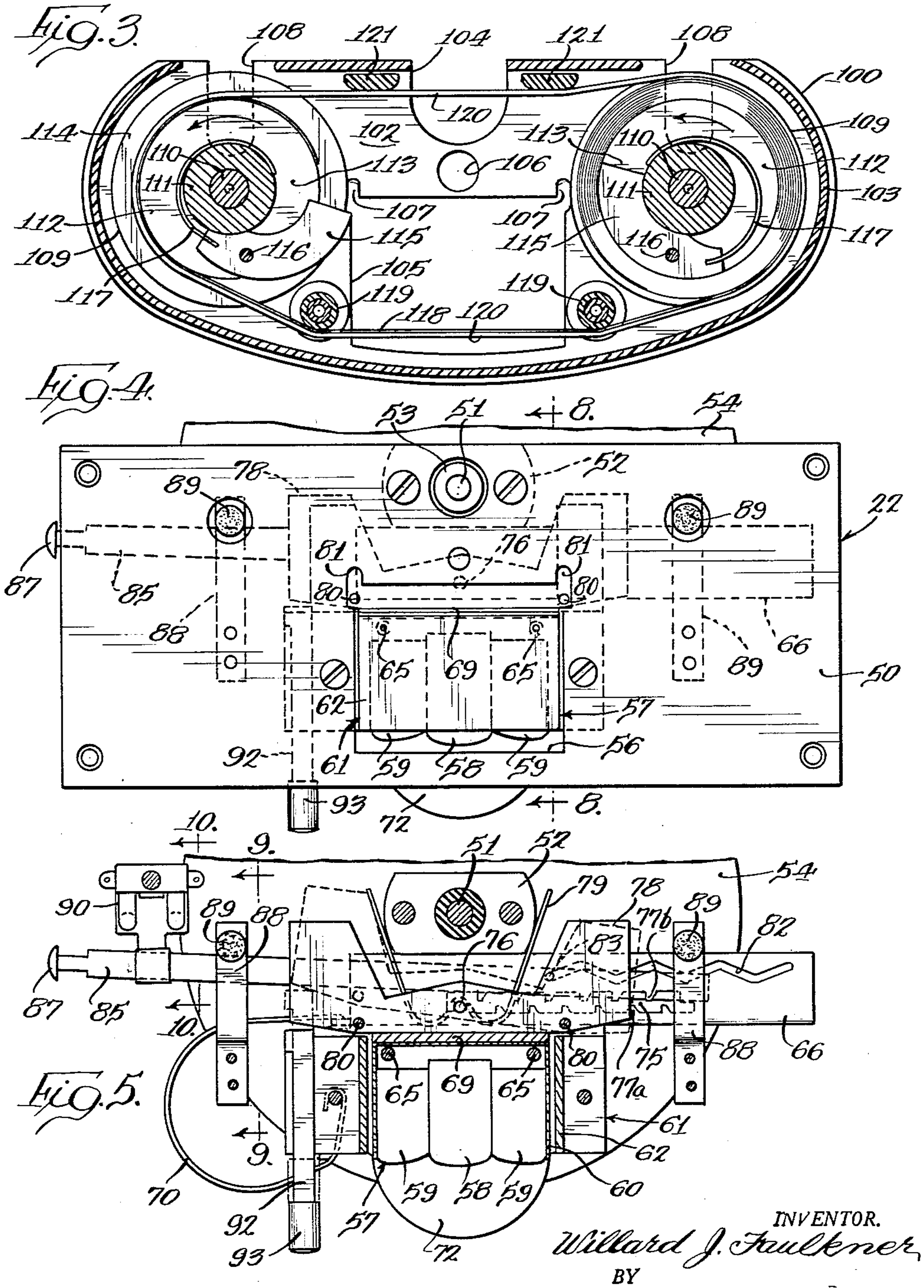
FIGURE 3 is a horizontal sectional view of the tape magazine, the view being taken substantially on line 3—3 of FIGURE 2.
FIGURE 4 is a plan view of the tape deck of the recorder, the view being taken substantially on line 4—4 of FIGURE 2.
FIGURE 5 is a horizontal sectional view of the recorder controlling mechanism, the view being taken substantially on line 5—5 of FIGURE 2 and showing the trip member in its normal position in solid lines and in one of its tripped positions in dotted lnes.
Figure 11:
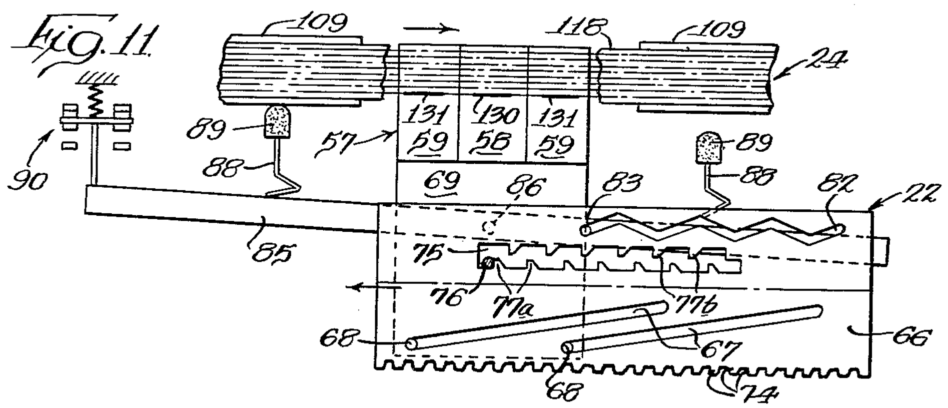
Figure 12:
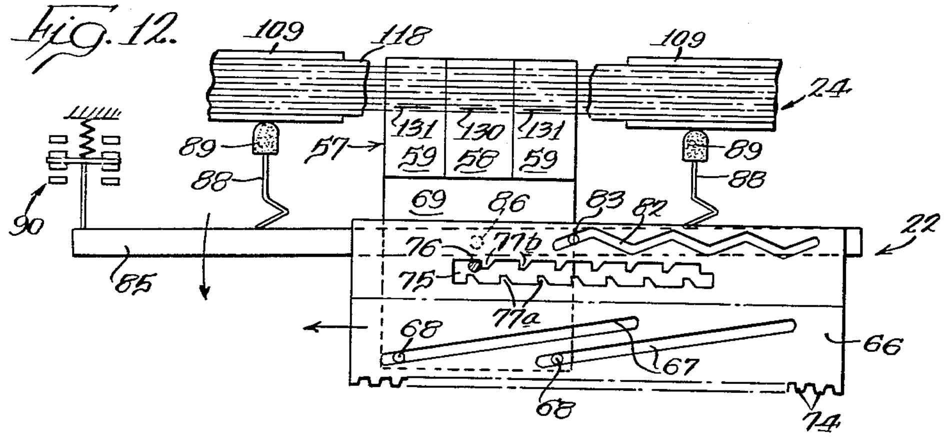
Figure 13:
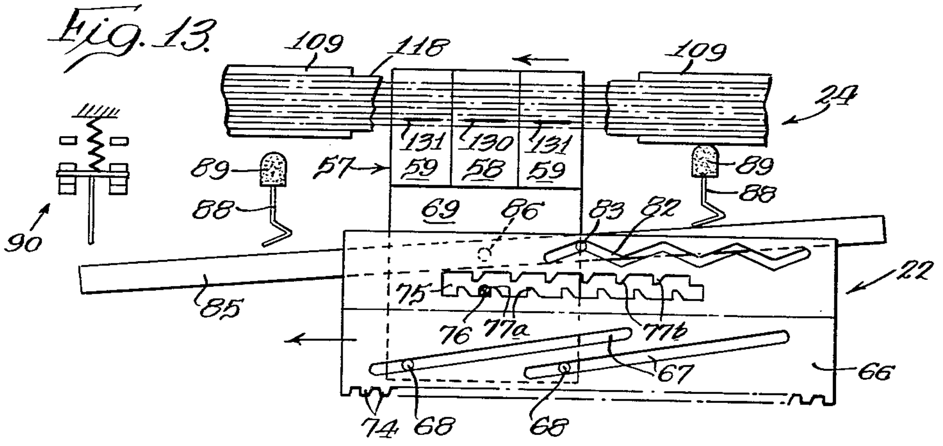

FIGURE 10 is a detail view, also on an enlarged scale, of the tape drive reversing switch employed in the preferred embodiment of the invention, the view being taken substantially on line 10—10 of FIGURE 5; and FIGURES 11, 12 and 13 are schematic representations (projected into a single plane) of the cam plate, the reversing lever and switch, the two reels and the reel brakes showing the several elements in position for a first direction of tape drive, a transitional position, and the position for the reverse direction of the drive, respectively.

Figure 1:
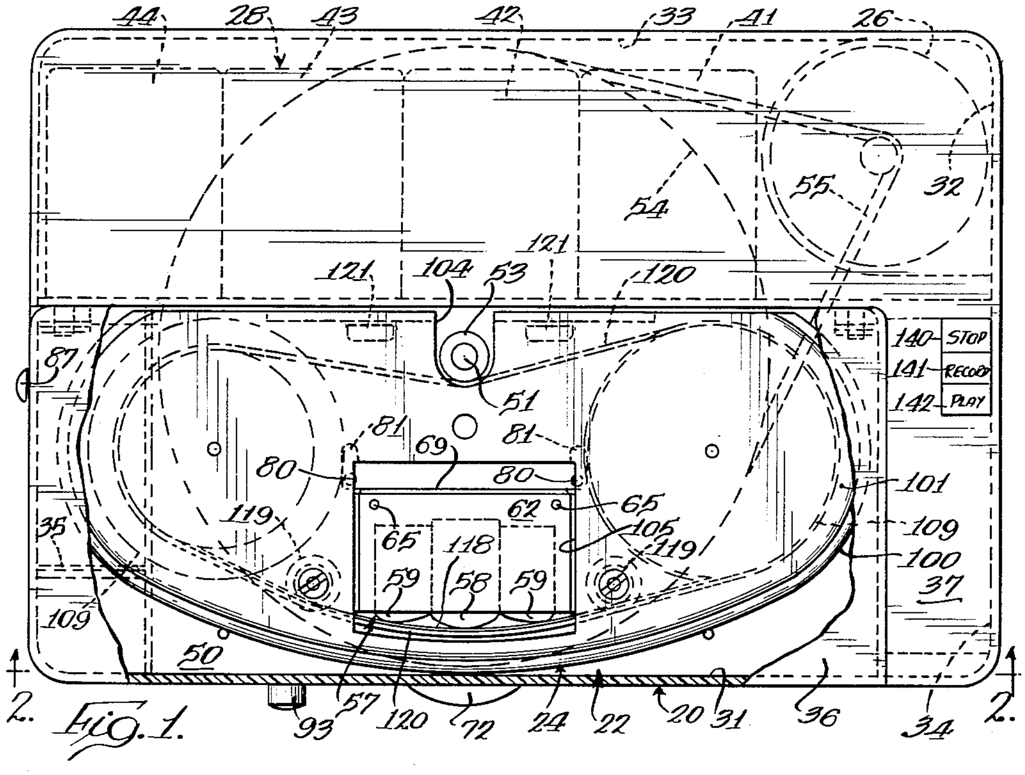
FIGURE 1 is a plan view of a tape recorder comprising a preferred embodiment of the invention, portions of the case or housing for the recorder being broken-away to reveal the tape magazine, the tape drive capstan and the recording-reproducing head.
Figure 2:
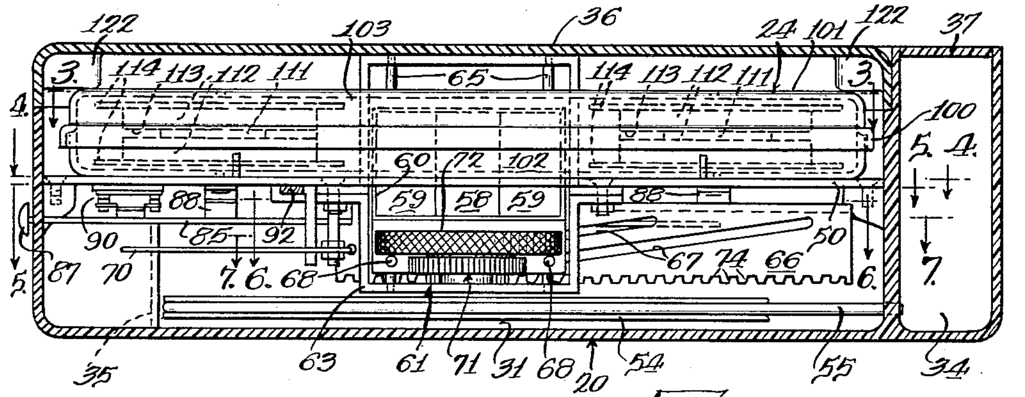
FIGURE 2 is a vertical sectional view of the recorder taken substantially on line 2—2 of FIGURE 1.

Referring now to the drawings, and particularly to FIGURES 1 and 2, the preferred embodiment of the recorder of the present invention is shown as comprising a compartmented case or housing 20 containing a tape deck or recorder mechanism 22, a tape magazine 24, an electric motor 26 and electrical components indicated in their entirety at 28.

The housing or case 20 may suitably comprise a molded plastic box, which in a practical physical embodiment may be about 5 inches long, 3¼ inches wide and 1¼ inches deep. The box is suitably partitioned to define a main compartment 31 for reception of the tape deck 22 and magazine 24, a motor compartment 32, one or more compartments 33 for the electrical components 28, and a pair of compartments 34 and 35 for reception of power supply batteries (not shown). The main compartment 31 is preferably provided with its own hinged cover 36, and the remainder of the compartments are suitably closed by relatively fixed but removable cover means 37.

To facilitate provision of a recorder in the small size indicated, and to render the same exceptionally light in weight, the motor 26 is preferably an A.C. motor of the self-contained high-frequency, high speed type. To supply this motor from the D.C. battery source, the electrical components 28 include an oscillator 41 energized from the source and coupled to the motor for energizing the same. Also included are a multi-purpose amplifier 42 adapted to be selectively coupled to the recording-reproducing head assembly of the tape deck mechanism for amplifying the signal input thereto and the signal output therefrom, a bias oscillator 43 for the said head assembly, and an RF oscillator 44 having input means coupled to the output means of the amplifier 42 when it is amplifying the signal output of said head for emitting a signal of value to operate a receiver, whereby a signal picked up by the head from a tape may be reproduced over a standard automobile or home radio. Since reproduction of the signal is thus effected according to the invention via a radio receiver, including the amplifier thereof, the recorder does not require a high power amplifier and a loudspeaker, and the amplifier 42 and oscillator 44 included therein need be only of small size and low power requirement, thereby further to contribute to the small size and light weight of the recorder.

The tape deck 22, which is shown in detail in FIGURES 4 through 10, comprises a main supporting plate or deck 50 that is preferably rectangular and adapted to be supported at its corners on bosses provided within the compartment 31 in the housing 20. Substantially centrally of its length, and adjacent one edge thereof, the deck 50 is apertured for passage therethrough of a capstan shaft 51. The shaft 51 extends substantially perpendicular to the deck and is rotatably mounted thereon by a bearing 52 that is secured to the lower surface of the deck. Above the deck, the shaft 51 carries a cylindrical capstan 53 for driving the tape. Below the deck, the shaft extends downwardly below the bearing 52 and at its lower end carries a large diameter flywheel 54 which is disposed in spaced parallel relation to the deck. This flywheel also serves as the input pulley for the capstan, its edge preferably being grooved for the purpose, and a pulley belt 55 is reeved over the flywheel and the shaft of the motor 26, as is illustrated in FIGURE 1, thereby to establish a drive connection between the capstan and the motor.

Aligned with the capstan shaft 51 along the transverse axis of the deck 50 is a rectangular opening 56 adapted for passage therethrough of a head assembly 57, which includes as its primary element an information translating head 58. In the case of a tape recorder, the head assembly 57 is specifically comprised of a recording-reproducing head 58, a pair of erase heads 59 disposed to opposite sides of the head 58, and a casing 60 for the heads, the entire assembly being movably mounted relative to the deck 50 by a bracket 61. The bracket 61 is comprised of two generally U-shaped straps 62 and 63 inverted relative to and stacked upon one another, so that the two straps define a generally rectangular frame. The straps include flange portions bolted or otherwise secured to the lower surface of the deck, the upper strap 62 extending upwardly through the opening 56 with the legs thereof extending substantially perpendicular to the deck and parallel to the transverse axis of the deck, and with the bight portion thereof overlying the opening 56. The lower strap 63 is aligned with the strap 62 and includes a bight portion underlying the opening 56, the said bight portion including an integral extension 64 parallel to and underlying the deck 50 and overlying the flywheel 54, and extending to adjacent the capstan shaft 51. The head assembly 57 is slidably mounted within the frame defined by the legs of the straps 62 and 63, and is preferably guided for movement therein perpendicular to the deck 50 by a pair of guide pins 65 extending between and secured to the bight portions of the two straps. The casing 60 of the head assembly 57 defines a pair of bearings through which the pins 65 extend for slidably mounting the assembly on the bracket.

To effect movement of the head assembly, the deck 22 includes a principal cam 66, which is preferably a slide plate formed of a sheet metal stamping. The cam or slide 66, in its preferred embodiment, comprises an L-shaped plate having a first leg disposed adjacent and parallel to the deck 50 and a second leg disposed adjacent the head assembly and extending substantially perpendicularly downward from the first leg. This plate, which is quite small, is slidably mounted for movement longitudinally of the deck 50 between the deck and the bracket extension 64, and in the space between the capstan shaft and the head assembly. In the said second or vertical leg thereof, the slide plate or cam is provided with a pair of spaced parallel inclined cam slots 67. Received within these slots are a pair of followers 68 which are fixed to a plate 69 depending from and constituting part of the head assembly 57. Consequently, movement of the cam or slide 66 longitudinally of the deck will result in movement of the head assembly 57 perpendicular to the deck.

Movement of the cam 66 in one direction is effected automatically by a spring or other suitable biasing means 70, the spring shown herein comprising a looped resilient wire hooked at one end to the cam and at its other end to the bracket 61 or one of the mounting bolts therefor. To move the cam in the opposite direction, a gear train 71 is provided on the upper surface of the bight portion of the lower strap 63, the train including a manually rotatable thumb wheel 72 projecting beyond the front edge of the tape deck, suitable intermediate gears, an output gear 73 and a rack 74 formed integrally in the lower edge portion of the cam 66 with which the gear 73 is meshed. Rotation of the thumb wheel 72 in the appropriate direction will thus cause the cam plate 66 to be moved in said opposite direction, whereupon the spring 70 will be tensioned and exert a biasing force on the cam plate for purposes of moving the same in the said one direction.

Figure 6:
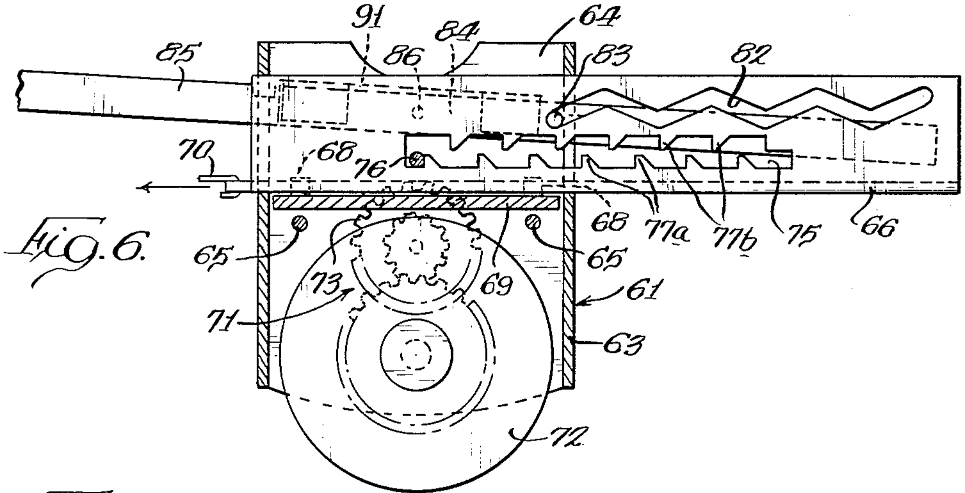
FIGURE 6 is a fragmentary horizontal section taken substantially on line 6—6 of FIGURE 2 and revealing the upper surface of the cam plate.
Figure 7:
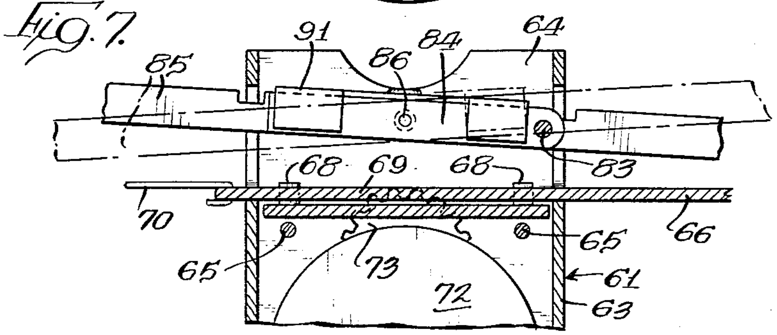
FIGURE 7 is a fragmentary horizontal section taken substantially on line 7—7 of FIGURE 2 and showing the reversing lever, the lever being illustrated in solid lines in one of its positions and in dotted lines in the other of its positions.

To govern spring-actuated movement of the cam plate, the cam is provided in the leg thereof parallel to the deck with an escapement slot 75 which will accommodate incremental movement of the cam step-by-step in the said one direction. Received within this slot is an escapement member 76 which is oscillatable in the slot to control the incremental movement of the cam. As illustrated in FIGURE 6, the cam 66 is biased to the left by the spring 70. The escapement slot 75 is so formed as to define on the cam two sets of opposed and staggered teeth **77*a* and 77*b*, each of which has a flat transverse surface facing to the left and an inclined surface facing to the right. The escapement member 76 comprises a pin of a diameter such that the same can only follow a sinuous path through the slot, i.e., from the first tooth 77*a* to the first tooth 77*b*, to the second tooth 77*a* to the second tooth 77*b*, etc. As shown in FIGURE 6, the pin 76** is engaging the first tooth 77*a* and is thereby holding the cam 66 in a first predetermined position. Upon movement of the pin toward the opposite (upper) side of the slot, the spring 70 will move the cam to the left until the first tooth 77*b* engages the pin, whereupon the pin momentarily holds the cam against movement. When the pin is returned toward its initial (lower) position, the spring again advances the cam to the left until the second tooth 77*a* engages the pin and thereby holds the cam in a second predetermined position. As a consequence of this construction, the cam is movable in equal increments toward the left through a sequence of predetermined positions. While the number of positions may be varied, I have shown herein an arrangement whereby the cam may be held in eight different positions, by virtue of provision of seven of the teeth 77*a* and an abutment surface at the right-hand end of the slot 75. As will be appreciated, the cam slots 67 will impart to the followers 68 and the head assembly 57 corresponding incremental movement through a sequence of predetermined positions. To return the cam, and thus the head, to the said first or initial position, it is only necessary to rotate the thumb wheel 72 in the appropriate direction, which is readily determined since the escapement pin 76 will prevent movement of the cam in the direction of spring biased movement. Upon rotation of the thumb wheel, the cam 66 is moved to the right and the inclined surfaces of the teeth move the escapement pin causing it to follow the sinuous path defined by the teeth, whereby the cam may be returned to its initial position, or any intermediate position as desired. Since the thumb wheel moves with the cam due to the gear connection therebetween, the thumb wheel may be appropriately marked to afford a visual indication of the position of the cam is in, that is, position 1, 2, 3, etc., up to 8 in the embodiment disclosed.

For purposes of mounting the escapement pin 76 and for effecting movement thereof, I provide a shiftable trip plate 78 in the space between the deck 50 and the cam 66, the pin 76 being secured to and depending from the central portion of the plate. The trip plate is generally U-shaped as viewed in plan (see FIGURE 5) and includes legs projecting to the opposite sides of the capstan shaft bearing 52. For resiliently positioning the plate, a hairpin spring 79 is provided, the spring engaging the pin 76 and having divergent legs biased toward one another and engaging the opposite sides of the bearing 52 for centering the plate relative to the bearing and for normally biasing the plate away from the bearing and toward the position wherein the pin 76 will be engaged by the teeth 77*a* of the cam plate. To accommodate tripping thereof, the trip plate includes two trip or feeler pins 80 which extend upwardly through respective slots 81 in the deck 50 adjacent and to opposite sides of the head assembly 57, whereby the pins are disposed to be responsive to passage or unwinding of the tape.

It is one object of this invention to drive the tape in opposite directions in successive positions of the cam plate 66, and it is for this reason that two trip pins are provided on the trip plate, the two pins being disposed to be responsive, respectively, to passage of the tape in opposite directions, and in particular, to be alternately moved by suitable abutment or cam means provided on the tape adjacent its ends or on the two reels provided for carrying the tape, a preferred embodiment of which means will be described hereinafter. In operation, as the tape is just about fully unwound from one of its reels, one of the trip pins 80 is moved toward the capstan, whereupon the plate 78 pivots about the outer pin 80 to move the escapement pin 76 in the escapement slot 75. The flywheel 54 will afford sufficient momentum at this time to move the abutment or cam means beyond the one trip pin 80, whereupon the spring 79 will return the plate 78 to its normal position to permit the cam plate 66 to advance to its next successive predetermined position. The direction of movement of the tape is then reversed, so that the tape is wound back onto the reel from which it was just unwound. As the tape is just about fully unwound from the other of its reels, the other of the trip pins 80 will be similarly moved toward the capstan and then returned to its initial position, whereupon the cam plate will advance to its next position and the tape will be driven in its first direction of movement to repeat the described cycle. This cycle continues through the several positions of cam plate movement provided by the escapement slot, thereby to provide for the recording or reproduction of a plurality of parallel information tracks on a tape.

Figures 8, 9:
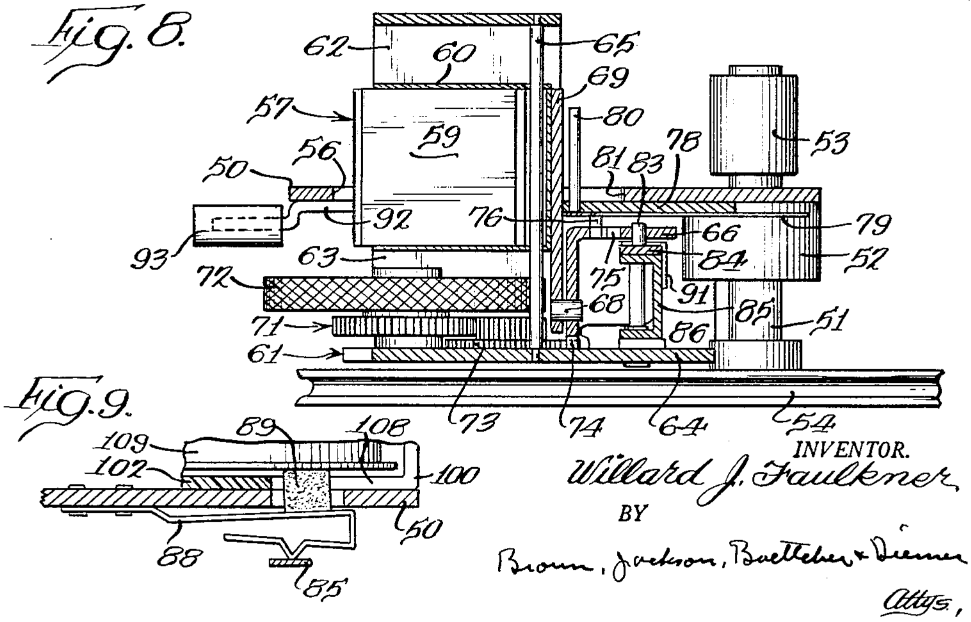
FIGURE 8 is a vertical cross-sectional view of the tape deck, the view being taken substantially on line 8—8 of FIGURE 4.
FIGURE 9 is a detail view, on an enlarged scale, of the brake for one of the reels, the view being taken substantially on line 9—9 of FIGURE 5.

From the foregoing, it is to be appreciated that automatic reversal of the direction of tape drive upon completion of tape movement in a given direction is a further and particular object of this invention. To this end, I provide means responsive to each increment of movement of the cam plate 66 for effecting reversal of the direction of tape drive. Specifically, I provide in the horizontal leg of the plate 66 an undulatory slot 82 which is correlated to the escapement slot 75 in that the crests of the undulatory slot are spaced the same distance apart as the teeth 77*a* of the escapement surface. Received within the slot 82 is a follower 83 in the form of a pin which is so disposed relative to the cam plate as to be located at the left end of the slot 82 (FIGURE 6) when the escapement pin 76 engages the first escapement tooth 77*a*. The follower 83 is connected by means of a plate 84 to a reversing lever 85 that is pivotally mounted on the strap extension 64 of the recorder frame by a pivot pin 86 located substantially on the transverse axis of the frame intermediate the head 57 and the capstan shaft 51. The lever 85 extends generally longitudinally of the deck 50 throughout substantially the full length thereof, and at one of its ends preferably extends outwardly beyond the edge of the deck and terminates in a manually engageable finger button 87. Due to the pivotal mounting of the lever and its connection to the follower 83, the lever oscillates between two end positions as the cam plate 66 is moved, the lever assuming one position in the first position of the cam plate, its other position in the second position of the cam plate, its first position in the third position of the cam plate, and so on. In one end position thereof, the lever 85 engages one of a pair of leaf springs 88 and in its other end position engages the other of the springs. Each spring is mounted on the lower surface of the deck 50 and is biased downwardly therefrom, and is adapted to be moved upwardly when engaged by the reversing lever, as shown in FIGURE 9. Each spring carries on its upper surface a brake shoe 89 projectable through a hole in the deck for a purpose to be described. Adjacent one end thereof, the lever is engageable with the movable blade means of a switch arrangement 90 which has suitable contact means for selectively energizing the erase heads 59 of the head assembly 57 and for selectively energizing the motor 26 for rotation in opposite directions. The switch assembly 90 is depicted for purposes of illustration as a double-pole, double-throw switch having a single, movable blade normally biased in one direction and movable in the other by means of the reversing lever, for example as depicted in FIGURE 10. Other arrangements may of course be provided. In the position of the reversing lever depicted in the drawings, the lever engages the switch blade, which may suitably be connected to the power supply, and moves the same upwardly into engagement with the upper pair of switch contacts, one of which is connected to the circuit of the erase heads to energize one of them, for example the left-hand one, and the other of which contacts is connected in the motor circuit to cause the motor to rotate in one direction, clockwise in the given example. In its other end position, the reversing lever releases the switch blade so that the same may engage the lower pair of contacts, whereupon the erase head circuit is conditioned for energization of the right-hand erase head and the circuit of the motor is conditioned for rotation of the motor in the counter-clockwise direction. Thus, the cam plate 66 provides for automatic reversal of tape drive upon each incremental movement thereof.

The reversing lever 85 also provides for manual reversal of the tape drive in the event the operator should desire to rewind the tape a short distance without proceeding to the next position of the cam plate. It is for this purpose that the lever is projected beyond the deck and provided with finger button 87. Since the plate 66 is not to be moved at this time, it is also necessary to accommodate movement of the lever 85 relative to the follower 83. To this end, the follower is flexibly connected to the lever by means of the plate 84 which is pivotally mounted on the pivot pin 86 and operatively connected to the lever 85 by a sheet metal spring 91. The spring 91, which is essentially a leaf spring, is secured centrally thereof to either the lever 85 or the plate 84 adjacent the pivot pin 86, and includes a pair of spring leaves extending to opposite sides of the pin and engaging the edges of the lever and the plate, thereby normally to connect the two for conjoint movement and also to accommodate relative movement of the lever upon manual actuation thereof.

A further control I prefer to incorporate in the tape deck is a means for manually tripping the escapement pin to accommodate advance of the cam plate to its next position at the will of the operator. As illustrated particularly in FIGURES 5 and 8, such control may take the form simply of a push rod 92 slidably mounted on the recorder frame transversely thereof and having an inner end engageable with the trip plate 78 and an outer end in the form of a push button 93 projecting beyond the front edge of the deck 50, whereby depression and release of the button will result in one incremental movement of the cam plate. As will be appreciated, the push button is normally biased outwardly by the trip plate spring 79, thereby to be exposed for the convenience of the operator.

From the foregoing, it is to be appreciated that the tape deck 22 is economically and compactly constituted and that the same, by virtue particularly of the single slide plate 66 and its associated followers 68, 73, 76 and 83, provides for automatic incremental movement of the head assembly transversely of the deck, for manual return of the head to its starting position or any intermediate position, and for automatic reversal of tape drive upon each incremental movement of the head. The entire assembly occupies a very small space and when mounted in the case 20 exposes to the upper surface of the deck 50 only the capstan 53, the head assembly 57, the guide strap 62, the feeler pins 80 and one of the brakes 89.

For cooperation with this improved tape deck, I provide an improved tape containing magazine, indicated generally at 24, which is illustrated in detail in FIGURES 1 to 3. As shown, the magazine 24 in its preferred embodiment includes a frame 100 comprising two complementary halves fitted together to form a box-like enclosure and providing spaced parallel top and bottom plates 101 and 102 and a peripheral wall 103. Substantially centrally of the box-like enclosure and at one side thereof, the plates 101 and 102 and the wall 103 are transversely slotted, as indicated at 104, to accommodate entry into the frame of the capstan 53. Adjacent the opposite side of the box or frame, the plates 101 and 102 are provided with aligned rectangular apertures, indicated at 105, complementary to and adapted for passage therethrough of the head assembly 57 and its guide strap 62. The apertures 105 especially have a dimension longitudinally of the frame closely complementary to the longitudinal dimension of the strap 62 so that the strap, when received within the apertures, will prevent longitudinal movement and/or cocking of the magazine relative to the tape deck. Transversely of the frame 100 the apertures 105 are preferably of a dimension greater than the transverse dimension of the head assembly to accommodate limited relative movement of the magazine transversely of the deck 50. In addition to the slot 104 and aperture 105, the bottom plate 102 is provided with a further aligning aperture 106 for reception of an aligning pin provided on the upper surface of the deck 50, the pin being significantly smaller than the aperture to accommodate some relative movement. Also, the bottom plate 102 is provided with slots 107 adjacent the aperture 105 which corresponded exactly to and are adapted to be aligned with the feeler pin slots 81 to accommodate entry of the feeler pins into the interior of the frame. At points aligned with the brake shoes 89, the bottom plate 102 is transversely slotted, as indicated at 108, to accommodate entry of the brake shoes into the frame.

Mounted within the interior of the frame 100 to opposite sides of the apertures 105 are a pair of tape receiving reels 109, which are preferably of identical construction. The reels are each permanently mounted within the frame in longitudinally spaced coplanar relation for rotation about fixed respective axles 110, which are suitably secured at their ends to the plates 101 and 102. Each reel includes a cylindrical hub portion 111 journalled on the axle 110, a pair of axially spaced cylindrical portions 112 which define the minor diameter of the reel at their peripheries and a circumferential slot 113 therebetween, and a pair of circular flange portions 114 which form the outer surfaces of the reel and define at their peripheries the major diameter of the reel. Each reel as thus far described may be manufactured as an integral member, or may be fabricated from parts, as desired. The reels are mounted with the peripheral edge of each immediately adjacent the adjacent one of the feeler pin slots 107, with the plane of their edges at the forward side of the magazine offset rearwardly or inwardly from the forward or outer edge of the apertures 105, and with the plane of their edges at the rearward side of the magazine intersecting the slots 104.

Within the circumferential slot 113 in each reel a cam or abutment member 115 is pivotally mounted on a pivot pin 116 disposed eccentrically of the reel axle. The cam or abutment member has an outer arcuate edge corresponding to the minor diameter of the reel and a pair of inner arcuate edge portions to opposite sides of its pivot axis which are complementary to the hub of the reel. Anchored at one end in the cam 115 is a leaf or wire spring 117 pre-tensioned to generally circular form so that the same engages and tends to coil about the hub 111, whereby the same biases one end of the cam toward the hub and the other end thereof outwardly of the reel. As illustrated at the left-hand side of FIGURE 3, the cam is of a length such that when the same is moved by the spring 117, said other end thereof projects outwardly of the reel to intersect the feeler pin slot 107, while the one end portion of the cam abuts against the hub 111 to limit the outward projection of said other end of the cam. As will be observed from FIGURE 3, the reels are mounted inversely relative to one another so that the end portion of each cam 115 that projects outwardly of the respective reel faces toward the rear of the magazine as it passes over the adjacent feeler pin slot 107, thereby to be in position to effect appropriate movement of the feeler pins 80 as will be described.

An elongate recording tape 118 is secured at the opposite ends thereof to the two reels and is wound upon the reels with the portion thereof extending between the reels at the side thereof adjacent the apertures 105, so that the tape intersects the apertures. As will be observed from the right-hand reel in FIGURE 3, winding of the tape upon the reel results in inward movement of the cam 115 fully into the interior of the slot 113. To guide the tape in its passage between the two reels, the magazine preferably includes a pair of rotatable guide spools 119 mounted within the frame 100 to opposite sides of the apertures 105. The spools 119 are spaced forwardly or outwardly from the reels, but rearwardly or inwardly from the forward edge of the apertures, so that the tape intersects the apertures.

For purposes of driving the tape and rotating the reels, the present invention provides a single element associated with the reels and engageable with the capstan 53. The said element comprises a simple elastic band 120 stretched over the two reels, and the guide spools 119, in overlying relation to the tape and in intersecting relation to the apertures 105 and the slots 104. The band is received between the flange portions 114 of each reel and the flanges of each spool 119 and firmly engages the outer surface of the tape. Consequently, the band retains the tape on the reels and prevents tape spill. To mitigate inadvertent movement of the tape and the reels, and formation of a loose loop of tape in the space between the reels, the magazine is provided with stops 121 engageable with the band to mitigate movement thereof. The stops preferably comprise immovable upright studs disposed to opposite sides of the slots 104 in substantial alignment with the plane of the adjacent edges of the reels, whereby the stops are disposed to engage the portion of the band passing between the two reels frictionally to retain the band, the reels and the tape against movement.

From the foregoing, it is apparent that the magazine is economically and compactly constituted and that the same is characterized by a pair of permanently mounted reels rotatable about fixed respective axes, an elastic band stretched over the reels in overlying relation to the tape wound thereon, and a frame that mounts the reels and accommodates access to the tape and the band.

To associate the magazine with the tape deck, it is only necessary to move the magazine downwardly relative to the deck to slip the same over the head assembly 57 and its guiding strap 62 to bring the elastic band 120 into engagement with the capstan 53. The capstan enters into the slots 104 and forces the elastic band inwardly to dispose the peripheral surface of the capstan in engagement with the outer surface of the band. The band is thus stretched to have forcible engagement with the capstan, and is moved inwardly away from the stops 121 to facilitate free movement of the band. At the same time, the strap 62 and head assembly 57 enter the apertures 105 and the heads 58 and 59 engage the interior surface of the tape between the guide spools 119 and force the tape and the band 120 outwardly, whereby the band is stretched over the head and holds the tape in engagement therewith. Also, the feeler pins 80 move into the slots 107 and the brake shoe 89 when urged upwardly by the reversing lever 85 enters the respective slot 108 and engages the lower surface of the respective reel 109. The magazine is thus centered on the tape deck by virtue of the strap 62 engaging within the apertures 105 and the capstan and the head having forcible engagement with the elastic band 120. The cover 36 of the recorder housing or case may then be closed, whereupon bosses 122 provided within the cover engage the upper plate 101 of the magazine frame and retain the magazine in flush engagement with the upper surface of the deck 50.

When the magazine is thus associated with the tape deck, and the cam plate 66 is moved to its starting position, as depicted in FIGURE 6, the recorder is ready for operation. At this time, the tape is wound substantially fully on the left-hand reel 109 and the head assembly 57 is in the lowest position accommodated by the inclined cam slots 67. The recording-reproducing head 58 of the assembly 57 includes a narrow horizontal pole piece 130 (FIGURES 11 to 13) which, in the disclosed embodiment of the invention, is adapted to record a magnetic sound track on the tape 118 within a width of .020 inch, and to reproduce the sound so recorded. Similarly, each head 59 has a pole piece 131 adapted upon energization of the respective head to erase such track individually. Utilizing a tape just ¼ of an inch wide, and a clearance between tracks of .010 inch, I am able to record eight separate sound tracks on a single tape. Thus, when the machine is ready for operation, the pole pieces 130 and 131 are disposed with their centers .020 inch above the lower edge of the tape. With a head capable of recording and reproducing a sound track that is no more than .006 inch wide, and an appropriate escapement arrangement, I am able to record twenty-five tracks on a single tape, employing a clearance between tracks of .004 inch and a clearance between the end tracks and the edges of the tape of .002 inch. In that case, the centers of the pole pieces are only .005 inch above the lower edge of the tape in the starting position of the apparatus. With such arrangements, I am further able to employ a tape 118 that is only 45 feet long which, with a tape speed of 4 feet per minute, will provide one and one-half hours recording time when eight sound tracks are made on the tape, and four and one-half hours recording time when twenty-five tracks are made. With either recording arrangement, the reels 109, even with the included cams 115, are only about 1¼ inches in diameter.

In addition to the above described components, the recording apparatus of the invention includes three manually operated push butons (FIGURE 1), namely, a "stop" button 140, a "record" button 141 and a "play" button 142, which actuate suitable switches or the like for controlling the operation of the apparatus, as is conventional in the art.

With the apparatus thus assembled and conditioned, operation is initiated by depression of the "record" button 141 which causes the motor 26 and the amplifier 42 and the oscillators 41 and 43 to be energized. With the reversing lever 85 in its starting position, the motor 26 is then energized to rotate the capstan clockwise as viewed in FIGURE 1, the left-hand erase head 59 in energized and the left-hand brake 89 is applied to the left-hand reel 109. The capstan, due to its frictional angagement with the band 120, then comences to drive the band in the counter-clockwise direction, whereupon the two reels 109 are rotated counter-clockwise (FIGURE 3) and the tape 118 is moved from the left-hand reel onto the right-hand reel, the tape moving over the head assembly from left to right to be erased or cleared by the left-hand head 59 and to have a sound track recorded thereon by the head 58, the input to the head 58 being by way of a microphone and the amplifier 42, as is conventional. As the recorder is started, the left-hand reel 109 (on which the tape is initially wound) has a greater effective diameter than the right-hand reel 109, so that the left-hand reel should rotate considerably slower than the right-hand reel. It is to insure this result that the brakes 89 are provided, the left-hand brake at this time being applied to the left-hand reel to impose a frictional drag thereon to insure against overrunning rotation of the reel from which the tape is being unwound. The elastic band and the tape of course move at the same speed and produce the necessary rotation of the reels to correspond to the linear movement of the tape. As recording proceeds, the right-hand reel will rotate progressively slower and the left-hand reel will rotate progressively faster due to the increase in the effective diameter of the right-hand reel as tape is wound thereon, and the decrease in effective diameter of the left-hand reel as the tape is unwound. The brake 89 simply imposes a frictional drag on the reel and thereby accommodates such rotation of the left-hand reel as may be necessary.

As the last layer of tape on the left-hand reel is unwound, the cam 115 therein is moved outwardly by the spring 117. As the sam is moved outwardly and rotated counter-clockwise, it engages the left-hand feeler pin 80 and shifts the trip plate 78 toward the capstan 53, whereupon the came plate 66 moves a half step, or one-half an increment, from the position shown in FIGURE 11 to the position shown in FIGURE 12, whereupon the motor is disconnected. At this time, the flywhel 54 provides sufficient momentum to carry the cam 115 past the pin 80 whereupon the trip plate is returned to its initial position and the cam plate 66 advances another half step to its next successive position, as depicted in FIGURE 13. When this occurs, the left-hand brake is released and the right-hand brake is applied, the left-hand erase head 59 is de-energized and the right-hand head energized, the head assembly is shifted upwardly .020 inch and the motor is energized to rotate in the reverse direction to drive the tape from right-to-left, whereupon the second of the eight tracks (depicted by dot-dash lines in FIGURES 11 to 13) may be recorded on the tape. As the direction of tape drive is reversed, the cam 115 in the left-hand reel will engage the adjacent feeler pin 80, but will not actuate the trip plate due to the direction of relative movement, and the cam will be moved inwardly against the urge of the spring 117 to clear the pin. Thereafter, the tape being wound upon the left-hand reel will force the cam back into the interior of the reel and recording may be continued without interruption until the tape is substantially fully unwound from the right-hand reel. As the last layer of tape is unwound from the right-hand reel, the cam 115 therein will actuate the escapement trip plate 78 to elevate the head assembly and reverse the direction of tape drive for recording of the third track.

Recording may thus continue without interruption throughout the full one and one-half hours of recording time provided. At the end of this time, another magazine may be substituted for the first to permit continued recording. When the tape has been fully recorded, it is then in its initial position, i.e., wound upon the left-hand reel, and conditioned for immediate playing. To play the tape back, the thumb wheel 72 is rotated to move the cam plate 66 to its right-hand or starting position and the "play" button 142 is depressed. The tape and head will then be moved to duplicate the movements that occurred during recording. In this case, however, depression of the "play" button results in disconnection of the erase heads, and connection of the amplifier to amplify the output of the head 58 and to couple the amplified signal to the RF oscillator 44, whereby the tape may be played-back over a standard radio. In this manner, the recorded tape may be played-back in full without interruption.

If at any time during recording or playing the operator desires to play or re-play a portion of the tape just recorded or played, he simply presses the "play" button 142 (if it is not already depressed) and manually actuates the reverse button 87, whereupon the tape is moved in the reverse direction. Upon release of the reverse button, the recorder will immediately commence to play or re-play the portion of the tape that was rewound during the time the reverse button was manually actuated. If the operator desires to re-record a selected portion of the tape, he simply depresses the "record" button 141 at any selected time, and commences recording. Should the operator desire to advance to the next track during recording or reproduction, he simply presses and then releases the advance button 93. Alternatively, if he should desire to go back one or more tracks, he simply rotates the thumb wheel 72. At any time that it is desired to render the recorder inoperative, the "stop" button 140 may be depressed, thereby to disconnect the components of the recorder from the power supply. Consequently, with the six simple manual controls 72, 87, 93, 140, 141 and 142, the operator is afforded complete control over the recorder.

From the foregoing, it is apparent that the present invention provides an improved and greatly simplified tape drive, a tape deck of particularly improved structure, an improved and simplified tape magazine affording a most facile manner of supplying and handling tape and the like, apparatus for obtaining maximum recording time from a minimum length of tape and thereby facilitating provision of an exceptionally compact recorder, improved operating mechanism for the recorder especially characterized by the single cam plate for carrying out the automatic operation of the unit, improved amplifier, play-back and motor arrangements having small space and power requirements, and finally a minute, lightweight recorder of pocket size capable of affording from one and one-half to four and one-half hours of recording time on a single tape of short length. Many of these features are applicable individually and in combination to other forms of apparatus employing reel-supplied information-carrying mediums. For example, the tape drive arrangement and the magazine structure could readily be applied to movie cameras and projectors by utilization of a transparent elastic band. Other uses and modifications will be apparent to those skilled in the art. Also, it is apparent that while all of the features of the invention have been shown herein to be applied to, and as contributing to, an exceptionally compact and small size tape recorder, that many of the features of the invention are applicable to apparatus of the general character substantially irrespective of size. In addition, it is observed that the magazine frame and/or the elastic band may be so formed as to constitute a magnetic shield for the tape. It is thus clear that all of the objects of the invention have been shown herein to be attained in a convenient, practical and economical manner.

While I have shown and described what I regard to be the preferred embodiment of my invention, it is to be appreciated that variations, changes, and rearrangements may be made therein without departing from the scope of the invention, as defined by the appended claims.

I claim:

1. A tape magazine comprising a frame including spaced parallel plates, a pair of reels permanently mounted on said frame between and parallel to said plates, said reels being mounted in spaced substantially coplanar relation for rotation about fixed respective axes, a tape wound on and extending between said reels at one side thereof, an elastic band stretched over said reels in overlying relation to said tape, an aperture in said frame in the space between said reels accommodating access to the interior surface of the portion of the tape extending between said reels, a guide spool rotatably mounted on said frame to each side of said aperture, said spools receiving and guiding the tape extending between said reels, an opening in said frame at the opposite side of said reels accommodating access to said band, and stop means on said frame adjacent said opening disposed substantially in the plane of the edges of the two reels for normally engaging said band and restraining the same against movement.

2. A tape magazine comprising a frame, a pair of reels rotatably mounted on said frame, a tape secured at its ends to said reels and wound thereon, and elastic band stretched over said reels in overlying relation to said tape, said frame accommodating access to said band and to said tape as it extends from one reel to the other, and a cam within at least one reel normally retained within the reel by the tape wound on the reel, said cam being movable outwardly of the respective reel upon unwinding of the tape from the respective reel for performing a control function.

3. In means for recording and/or reproducing a plurality of information tracks on tape and the like, a supporting deck over which the tape is moved, an information translating head mounted on said deck for movement transversely of the tape, a cam movably mounted on said deck, means operatively connecting said cam and said head for moving said head upon movement of said cam, means for biasing said cam in one direction of movement thereof, an escapement surface on said cam for controlling movement of said cam in said one direction, and an escapement member engaging said escapement surface and operatively responsive to passage of the tape for momentarily releasing said cam for incremental movement in said one direction, said cam upon incremental movement thereof moving said head a corresponding increment transversely of the tape to dispose said head adjacent a different portion of the tape.

4. In means for recording and/or reproducing a plurality of information tracks on tape and the like, a supporting deck over which the tape is moved, an information translating head mounted on said deck for movement transversely of the tape, a cam movably mounted on said deck, means operatively connecting said cam and said head for moving said head upon movement of said cam, means for biasing said cam in one direction of movement thereof, an escapement surface on said cam controlling movement of said cam in said one direction, an escapement member engaging said escapement surface and operatively responsive to passage of the tape for momentarily releasing said cam for incremental movement in said one direction, said cam upon incremental movement thereof moving said head a corresponding increment transversely of the tape to dispose said head adjacent a different portion of the tape, and means supported by said deck and operatively connected to said cam for moving said cam in the opposite direction of movement thereof.

5. In means for recording and/or reproducing a plurality of information tracks on tape and the like, a supporting deck over which the tape is moved, reversible means for moving the tape in opposite directions, an information translating head mounted on said deck for movement transversely of the tape, a cam movably mounted on said deck, means operatively connecting said cam and said head for moving said head upon movement of said cam, means for biasing said cam in one direction of movement thereof, an escapement surface on said cam for controlling movement of said cam in said one direction, an escapement member engaging said escapement surface and operatively responsive to substantially complete passage of the tape in each direction for momentarily releasing said cam upon each passage of the tape for incremental movement in said one direction, said cam upon incremental movement thereof moving said head a corresponding increment transversely of the tape to dispose said head adjacent a different portion of the tape, an undulatory surface on said cam correlated to said escapement surface, a reverse member having a follower engaging said undulatory surface, and means operatively connected to said reverse member and said tape driving means for reversing the direction of movement of the tape upon each incremental movement of said cam.

6. In means for recording and/or reproducing a plurality of information tracks on tape and the like, a supporting deck over which the tape is moved, an information translating head slidably mounted on said deck for movement transverely of the tape, a cam member slidably mounted on said deck for movement transversely of the direction of movement of said head, an inclined cam slot in said cam member, a cam follower associated with said head engaged in said slot, means for biasing said cam member in one direction of movement thereof, an escapement slot in said cam member for controlling movement of said cam member in said one direction, and an escapement pin engaging in said escapement slot and operatively responsive to passage of the tape for momentarily releasing said cam member for incremental movement in said one direction, said cam member upon incremental movement thereof moving said head a corresponding increment transversely of the tape to dispose said head adjacent a different portion of the tape.

7. In means for recording and/or reproducing a plurality of information tracks on tape and the like, a supporting deck over which the tape is moved, reversible means for driving the tape in opposite directions, an information-translating head slidably mounted on said deck for movement transversely of the tape, a cam member slidably mounted on said deck for movement transversely of the direction of movement of said head, an inclined cam slot in said cam member, a cam follower associated with said head engaged in said slot, means for biasing said cam member in one direction of movement thereof, an escapement slot in said cam member for controlling movement of said cam member in said one direction, an escapement pin engaging in said escapement slot and operatively responsive to substantially complete passage of the tape in each direction for momentarily releasing said cam member upon each passage of the tape for incremental movement in said one direction, said cam member upon incremental movement thereof moving said head a corresponding increment transversely of the tape to dispose said head adjacent a different portion of the tape, an undulatory slot in said cam member correlated to said escapement slot, a follower engaged in said undulatory slot, a reversing member flexibly connected to said follower for movement normally with the follower and for movement independently of the follower, and means operatively connected to said reverse member and said tape driving means for reversing the direction of movement of the tape upon each incremental movement of said cam member.

8. In means for recording and/or reproducing a plurality of information tracks on tape and the like, a supporting deck over which the tape is moved, a capstan to the upper side of said deck for engaging and moving the tape, a shaft for said capstan extending through and journalled on said deck, a reversible motor operatively connected to said shaft for rotating the same, an information-translating head mounted on said deck adjacent said capstan for movement substantially perpendicular to said deck, a cam plate mounted on said deck to the lower side thereof between said head and said shaft, said plate being mounted for sliding movement parallel to the deck substantially normal to the plane of said head and said shaft, said plate including a portion perpendicular to said deck having an inclined cam surface, a cam follower associated with said head engaging said inclined cam surface, means biasing said plate in one direction of movement thereof, an escapement surface on said plate, an escapement means engaging said escapment surface for controlling movement of said plate in said one direction, said escapement means including feeler means extending adjacent said head and responsive to substantially complete passage of the tape in each direction for moving said escapement means momentarily to release said plate for incremental movement in said one direction, thereby to cause corresponding incremental movement of said head perpendicular to said plate, an undulatory surface on said plate, a reversing lever having a follower engaging said undulatory surface, said lever being disposed adjacent and generally paralleling said plate, means operatively connected to said reversing lever and said motor for reversing the direction of rotation of said capstan upon each incremental movement of said plate, a drive surface on said plate, and drive means extending beneath said head and engaged with said surface for moving said plate in the opposite direction.

9. In means for recording and/or reproducing a plurality of information tracks on tape and the like, a supporting deck over which the tape is moved, a capstan to the upper side of said deck for engaging and moving the tape, a shaft for said capstan extending through and journalled on said deck, a flywheel for said capstan secured to said shaft below said deck, a reversible motor operatively connected to said flywheel, a shaft and capstan below said deck for rotating the same, an aperture in said deck adjacent and to one side of said capstan, an information-translating head slidably mounted on said deck for movement through said aperture substantially perpendicular to said deck, an L-shaped cam plate mounted on said deck to the lower side thereof between said head and said shaft, said plate paralleling said deck and being mounted for sliding movement parallel to the deck and substantially normal to the plane of said head and said shaft, said plate including a first leg adjacent said head and perpendicular to said deck having an inclined cam slot therein, a cam follower associated with said head engaged in said slot, means biasing said plate in one direction of movement thereof, said plate including a second leg adjacent and parallel to said deck having an escapement slot therein for controlling movement of said plate in said one direction, escapement pin means engaged in said escapement slot and including feeler means extending adjacent said head and responsive to substantially complete passage of the tape in each direction for moving said pin means in said slot momentarily to release said plate for incremental movement in said one direction, thereby to cause corresponding incremental movement of said head perpendicular to said plate, an undulatory slot in said second leg of said plate, a follower engaged in said undulatory slot, a reversing lever pivotally supported by said deck and flexibly connected to said follower for normal movement therewith and for independent movement relative thereto, said lever generally paralleling said plate and being disposed adjacent said second leg thereof, means operatively connected to said reversing lever and said motor for reversing the direction of rotation of said capstan upon each incremental movement of said plate and each independent movement of said lever, said lever extending outwardly beyond said deck for manual actuation thereof, a trip member movably mounted on said deck and extending from the exterior thereof to adjacent said feeler means for manually actuating said escapement pin, gear teeth on said first leg of said plate adjacent the edge thereof opposite said deck, and a gear train engaged with said teeth and extending beneath said head and including a drive element extending to the exterior of the deck for manually moving said plate in the opposite direction.

10. A tape machine comprising a supporting deck, a capstan rotatably mounted on said deck and extending to one side thereof, an information-translating head mounted on said deck adjacent said capstan for movement substantially perpendicular to the deck, a cam movably mounted on said deck to the opposite side thereof, said cam and head having cooperating cam and cam follower surfaces for effecting movement of said head perpendicular to said plate upon movement of said cam, means biasing said cam for movement in one direction, an escapement surface on said cam for controlling movement thereof in said one direction, a shiftable member mounted on said deck and including an escapement member engaging said escapement surface and a pair of feeler pins extending to said one side of said deck at opposite sides of said head, a rotatable reel disposed to each side of said head and capstan and having its periphery disposed adjacent the adjacent one of said feeler pins, a tape wound on said reels and extending between said reels and across said head, an elastic band stretched over said reels and said head in overlying relation to the tape, said band frictionally engaging said capstan to be driven thereby, each of said reels including means responsive to unwinding of the tape therefrom for engaging the adjacent feeler pin upon unwinding of the tape and moving said shiftable member to move said escapement element and accommodate incremental movement of said cam in said one direction, a reversible drive motor operatively connected to said capstan for rotating the same in opposite directions, a reversing member, means operatively connected to said reversing member and said motor for reversing the direction of rotation of said capstan upon each movement of said member, an undulatory surface on said cam correlated to said escapement surface, and a follower on said reversing member engaging said undulatory surface for moving said reversing member upon each movement of said cam.

11. A tape machine comprising a supporting deck, a capstan rotatably mounted on said deck and extending to one side thereof, an information-translating head mounted on said deck adjacent said capstan for movement substantially perpendicular to the deck, a cam movably mounted on said deck to the opposite side thereof, said cam and head having cooperating cam and cam follower surface for effecting movement of said head perpendicular to said deck upon movement of said cam, means biasing said cam for movement in one direction, an escapement surface on said cam for controlling movement thereof in said one direction, a shiftable member mounted on said deck and including an escapement member engaging said escapement surface and a pair of feeler pins extending to said one side of said deck at opposite sides of said head, a rotatable reel disposed to each side of said head and said capstan and having its periphery disposed adjacent the adjacent one of said feeler pins, a tape wound on said reels and extending between said reels and across said head, an elastic band stretched over said reels and said head in overlying relation to the tape, said band frictionally engaging said capstan to be driven thereby, each of said reels including means responsive to unwinding of the tape therefrom for engaging the adjacent feeler pin upon unwinding of the tape and moving said shiftable member to move said escapement member and accommodate incremental movement of said cam in said one direction, a reversible drive motor operatively connected to said capstan for rotating the same in opposite directions, a reversing member, means operatively connected to said reversing member and said motor for reversing the rotation of said capstan upon movement of said member, an undulatory surface on said cam correlated to said escapement surface, a follower on said reversing member engaging said undulatory surface for moving said reversing member upon each movement of said cam, and a brake for each reel mounted on said deck and engageable with and disengageable from the respective reel, said reversing member being operatively associated with said brakes for applying the brake to the reel from which the tape is to be unwound and for releasing the brake from the reel onto which the tape is to be wound according to the direction of rotation of said capstan.

12. A portable tape recorder comprising a housing having compartments for a motor and a tape deck, a tape deck mounted in the respective compartment and including a supporting deck, a capstan rotatably mounted on said deck and extending to one side thereof, a recording head mounted on said deck adjacent said capstan for movement substantially perpendicular to the deck, a cam plate slidably mounted on said deck to the opposite side thereof for movement parallel thereto between said head and said capstan, said plate and head having cooperating cam and cam follower surfaces for effecting movement of said head perpendicular to said deck upon movement of said plate parallel to said deck, means biasing said plate for movement in one direction, an escapement surface on said plate for controlling movement thereof in said one direction, a shiftable member mounted on said deck and including an escapement member engaging said escapement surface and a pair of feeler pins extending to said one side of said deck at opposite sides of said head, a tape magazine detachably slipped over said head and said capstan in cooperative relation thereto, said magazine including a frame accommodating entry therein of said head and capstan, a reel rotatably mounted on said frame to each side of said head and capstan and having its periphery disposed adjacent the adjacent one of said feeler pins, a tape wound on said reels and extending between said reels and across said head, and an elastic band stretched over said reels and said head in overlying relation to the tape, said band frictionally engaging said capstan to be driven thereby, each of said reels including a radially apertured hub and a radially movable cam mounted in the hub and biased outwardly thereof, each of said cams normally being retained within its hub by the tape wound on the respective reel and being biased outwardly of the respective reel upon unwinding of the tape therefrom for engaging the adjacent feeler pin and moving said shiftable member to move said escapement member and accommodate incremental movement of said cam plate in said one direction, an undulatory surface on said cam plate correlated to said escapement surface, a reversing member having a follower engaging said undulatory surface for moving said reversing member upon each movement of said plate, a reversible drive motor mounted in the respective compartment and operatively connected to said capstan for rotating the same in opposite directions, and means operatively connected to said reversing member and said motor for reversing the direction of rotation of said capstan upon each movement of said member.

References Cited in the file of this patent

UNITED STATES PATENTS

| | | |
|---|---|---|
| 2,694,110 | Roberts | Nov. 9, 1954 |
| 2,914,620 | Dale | Nov. 24, 1959 |
| 2,959,644 | Grace | Nov. 8, 1960 |

FOREIGN PATENTS

| | | |
|---|---|---|
| 343,893 | Great Britain | Feb. 20, 1931 |